United States Patent
O'Brien et al.

(10) Patent No.: US 7,962,906 B2
(45) Date of Patent: Jun. 14, 2011

(54) COMPILER METHOD FOR EMPLOYING MULTIPLE AUTONOMOUS SYNERGISTIC PROCESSORS TO SIMULTANEOUSLY OPERATE ON LONGER VECTORS OF DATA

(75) Inventors: John Kevin Patrick O'Brien, South Salem, NY (US); Kathryn M. O'Brien, South Salem, NY (US); Daniel Arthur Prener, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 1125 days.

(21) Appl. No.: 11/686,400

(22) Filed: Mar. 15, 2007

(65) Prior Publication Data
US 2008/0229298 A1    Sep. 18, 2008

(51) Int. Cl.
G06F 9/45       (2006.01)
G06F 15/76      (2006.01)

(52) U.S. Cl. ............ 717/160; 717/149; 717/150; 712/9; 712/20

(58) Field of Classification Search .................. 717/149, 717/160, 150; 712/22, 9, 20
See application file for complete search history.

(56) References Cited

U.S. PATENT DOCUMENTS

| | | | | |
|---|---|---|---|---|
| 4,710,872 A * | 12/1987 | Scarborough | ............... | 717/160 |
| 5,093,916 A * | 3/1992 | Karp et al. | .................... | 719/331 |
| 5,230,053 A * | 7/1993 | Zaiki | ............................. | 717/150 |
| 5,517,656 A * | 5/1996 | Shi | ................................. | 712/29 |
| 6,113,650 A * | 9/2000 | Sakai | ............................ | 717/160 |
| 6,272,616 B1 * | 8/2001 | Fernando et al. | ............... | 712/20 |
| 6,292,822 B1 * | 9/2001 | Hardwick | ...................... | 718/105 |
| 7,475,392 B2 * | 1/2009 | Eichenberger et al. | ........ | 717/150 |
| 2004/0006667 A1 * | 1/2004 | Bik et al. | ....................... | 711/100 |
| 2008/0034356 A1 * | 2/2008 | Gschwind | ...................... | 717/149 |

OTHER PUBLICATIONS

Bik et al., "Atomatic Intra-Register Vectorization for the Intel Architecture", Apr. 2002, International Journal of Parallel Programming, vol. 30, No. 2, pp. 65-98.*
Nuzman et al., "Auto-Vectorization of Interleaved Data for SIMD", Proceedings of the ACM SIGPLAN 2006 Conference on Programming Language Design and Implementation, pp. 1-23. http://research.microsoft.com/en-us/um/redmond/events/pldi06/presentations/nuzman-rosen-zaks_pldi06.ppt#256,1,Auto-Vectorization of Interleaved Data for SIMD.*

* cited by examiner

*Primary Examiner* — Wei Y Zhen
*Assistant Examiner* — Chih-Ching Chow
(74) *Attorney, Agent, or Firm* — Yee & Associates, P.C.; Matthew B. Talpis

(57) ABSTRACT

A compiler includes a mechanism for employing multiple synergistic processors to execute long vectors. The compiler receives a single source program. The compiler identifies vectorizable loop code in the single source program and extracts the vectorizable loop code from the single source program. The compiler then compiles the extracted vectorizable loop code for a plurality of synergistic processors. The compiler also compiles a remainder of the single source program for a principal processor to form an executable main program such that the executable main program controls operation of the executable vectorizable loop code on the plurality of synergistic processors.

9 Claims, 5 Drawing Sheets

COMPILER METHOD FOR EMPLOYING MULTIPLE AUTONOMOUS SYNERGISTIC PROCESSORS TO SIMULTANEOUSLY OPERATE ON LONGER VECTORS OF DATA

BACKGROUND OF THE INVENTION

1. Field of the Invention

The present application relates generally to data processing and, in particular, to compilation of source code to generate executable code. Still more particularly, the present application relates to a compiler method for employing multiple autonomous synergistic processors to operate simultaneously on long vectors.

2. Description of the Related Art

A single instruction multiple data (SIMD) data processing system is a computer that can perform a single operation on multiple sets of data. For example, a SIMD data processing system may, for example, add or multiply sets of numbers at the same time. Performing a single operation on multiple sets of data in parallel is referred to as "SIMDization" or "vectorization." The term SIMDization is used when referring to "short" vectors, such as those that fit into a 128-bit wide register in a processor. Vectorization is a broader term that is typically used to refer to longer vectors and may include the shorter vectors. Vectorization is typically used to operate on two or more groups of data or array elements at the same time, for example for multimedia encoding and rendering as well as scientific applications. Hardware registers are loaded with numerical data and the computation is performed on all data in a register, or even a set of registers, simultaneously.

In a computer processor that has a principal processor and multiple ancillary processors capable of executing SIMD instructions, a developer may write code for execution on the ancillary processors to take advantage of their SIMD execution characteristics and write code for the principal processor, to manage the data transfer between and synchronization with the ancillary processors. The code which executes on the principal processor will run sequentially. In other words, none of the computations will be performed in parallel. This type of code is referred to as a sequential code.

Programmers write code for the ancillary processor to execute SIMD instructions by using the language provided intrinsics or built-in functions or by employing the automatic vectorization features of a compiler. A SIMD instruction is an instruction, which operates on multiple data elements in parallel. Examples of such instructions include those which operate on 2 double precision data elements, 4 integer data elements or 8 byte data elements. SIMD parallelism is an ability to detect at compile time that subsets of data may be operated on in parallel, determine when these types of analyses are performed and generate code to use SIMD instructions.

Exploiting this parallelism in processing data on a single SIMD accelerator, is a complex task for a programmer and requires Et high degree of manual intervention. An example of a SIMD accelerator is a synergistic processor element which is found in a multi-core processor, such as the Cell Broadband Engine™ processor, which is available from International Business Machines Corporation. "Cell Broadband Engine" is a trademark of Sony Computer Entertainment, Inc. in the United States, other countries, or both, and is used under license therefrom. Furthermore, to exploit this parallelism across multiple SIMD accelerators is even more difficult and requires the programmer to be aware of more than just the available SIMD parallelism. The programmer must also be concerned with the placement of the code on each of the SIMD accelerators, synchronization of the execution of this code, and the placement and fetching of the data to the appropriate accelerators to ensure the highest performance execution.

Current approaches to exploiting SIMD parallelism require the programmer to use intrinsics. Intrinsics are built-in functions provided by the language to allow the user to invoke vector instructions directly and limit the exploitation to a single ancillary accelerator or processor. To harness the parallelism across multiple ancillary SIMD accelerators one could insert directives called pragmas, which are source level instructions to the compiler. Alternatively, coarse grained auto-parallelization techniques, such as those at the loop level, can be used. Both of these approaches, however, have the potential to introduce the overhead of scalar execution on the ancillary accelerators or processors, since the typical parallelizable loop may contain more than just strictly vectorizable computation. A loop is a repetition of instructions in a program. The manner in which vectorization is performed in the above-described approach requires that a parallel loop be outlined. After outlining, vectorization opportunities are detected within that particular loop. The resulting loop is then prepared for execution across the principal processor and all the ancillaries. Vectorization opportunities within these outlined loops are constrained by any limitations imposed by known automatic SIMDization techniques. Specifically, this type of approach confines the generation of SIMD code to stride-1 array accesses, that is to say, accesses wherein each array element access is contiguous, as in a(i), a(i+1), a(i+2) as opposed to non-contiguous as in a(i), a(i+3), a(i+6).

In most multi-core processors, a programmer currently has to create or modify an existing application to efficiently use different execution units. Currently, a programmer manually creates an application or transforms an existing application such that the principal processor element (PPE) processor provides the control functions and the multiple synergistic processor elements (SPEs) operate in parallel on all the numeric or compute-intensive sections of the application.

The developer typically writes code to use each SPE for frequently repeated tasks to take advantage of the SIMD instruction set either through the use of SIMD intrinsics or by availing of the automatic support in an automatic SIMDizing compiler. Programmers typically write code in which the PPE controls and sets up the global synchronization. The operating system runs on the PPE and allocates resources, controls devices, and provides system services. Programmers write code to use the PPE for less frequently repeated tasks with more random data access.

However, currently the programmer writes the SPE code and separate PPE code manually. The programmer specifically develops SPE code so that the SPE executable code is correctly synchronized with the PPE by linkage or runtime library code.

SUMMARY OF THE INVENTION

The illustrative embodiments described herein provide a computer implemented method, apparatus, and computer usable program code for employing multiple SIMD accelerators to perform parallel computation on long vectors. A compiler receives a single source program. The compiler identifies vectorizable loop code in the single source program and extracts the vectorizable loop code from the single source program. The compiler then compiles the extracted vectorizable loop code for a plurality of synergistic processors. The compiler also compiles the sequential portion of the single source program for a principal processor to form an executable main program such that the executable main program controls the parallel execution of the vectorized loop code on the plurality of SIMD accelerators or processors, and also manages the data movement between the main and ancillary processor memories.

BRIEF DESCRIPTION OF THE DRAWINGS

The novel features believed characteristic of the invention are set forth in the appended claims. The exemplary embodiments, however, as well as a preferred mode of use, further objectives and advantages thereof, will best be understood by reference to the following detailed description when read in conjunction with the accompanying drawings, wherein:

DETAILED DESCRIPTION OF THE PREFERRED EMBODIMENT

With reference now to the figures, FIGS. 1-4 depict illustrative examples of data processing environments in which aspects of the exemplary embodiments may be implemented. It should be appreciated that FIGS. 1-4 are only exemplary and are not intended to assert or imply any limitation with regard to the environments in which aspects or embodiments may be implemented. Many modifications to the depicted environments may be made without departing from the spirit and scope of the illustrative embodiments.

Figure 1:
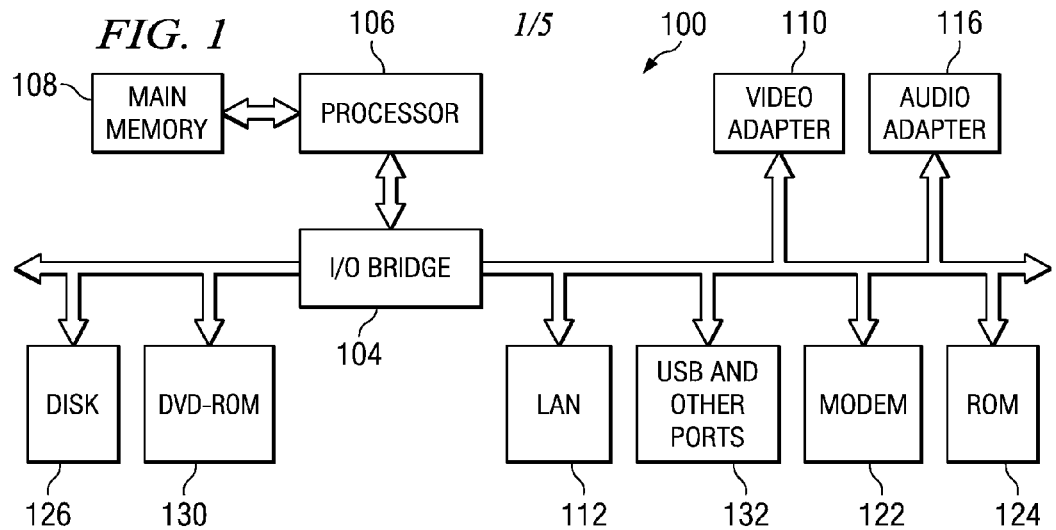
FIG. 1 is a block diagram of a data processing system in which aspects of the illustrative embodiments may be implemented.

With reference now to FIG. 1, a block diagram of a data processing system in which aspects of the illustrative embodiments may be implemented. Data processing system 100 is an example of a computer in which code or instructions implementing the processes of the exemplary embodiments may be located. In the depicted example, data processing system 100 employs a hub architecture including an I/O bridge 104. Processor 106 is connected directly to main memory 108, while processor 106 is connected to I/O bridge 104.

In the depicted example, video adapter 110, local area network (LAN) adapter 112, audio adapter 116, modem 122 read only memory (ROM) 124, hard disk drive (HDD) 126, DVD-ROM drive 130, universal serial bus (USB) ports and other communications ports 132 may be connected to I/O bridge 104. ROM 124 may be, for example, a flash binary input/output system (BIOS). Hard disk drive 126 and DVD-ROM drive 130 may use, for example, an integrated drive electronics (IDE) or serial advanced technology attachment (SATA) interface.

An operating system or specialized program may run on processor 106 and is used to coordinate and provide control of various components within data processing system 100 in FIG. 1. Instructions for the operating system or specialized program or programs are located on storage devices, such as hard disk drive 126, and may be loaded into main memory 108 for execution by processor 106. The processes of the exemplary embodiments may be performed by processor 106 using computer implemented instructions, which may be located in a memory such as, for example, main memory 108, memory 124, or in one or more peripheral devices, such as hard disk drive 126 or DVD-ROM drive 130.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the present invention may be applied to a multi-processor data processing system.

For example, data processing system 100 may be a general purpose computer, a video game console or other entertainment device, or a server data processing system. The depicted example in FIG. 1 and above-described examples are not meant to imply architectural limitations. For example, data processing system 100 also may be a personal digital assistant (PDA), tablet computer, laptop computer, or telephone device.

Figure 2:
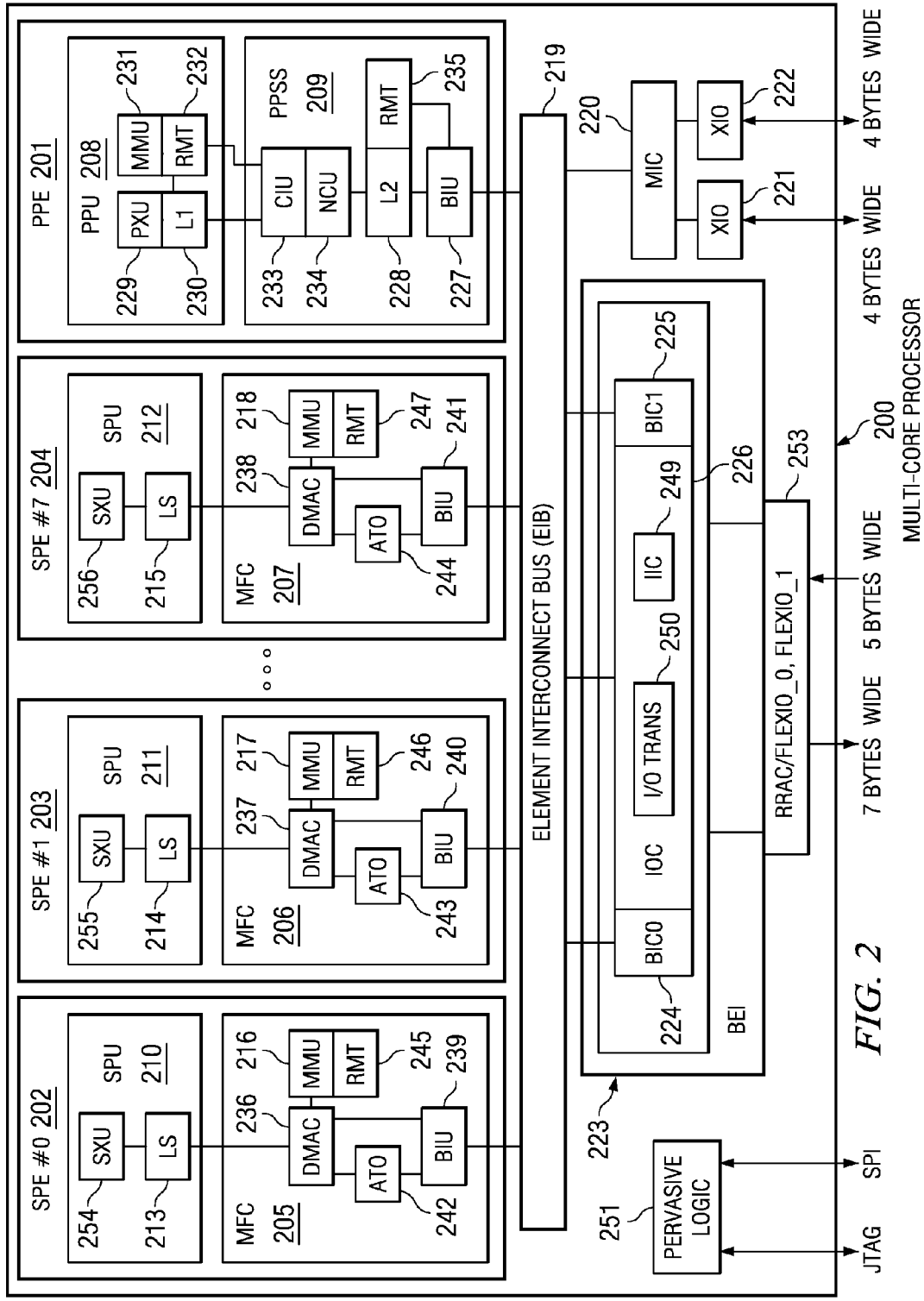
FIG. 2 is an exemplary diagram of a processor in which aspects of the illustrative embodiments may be implemented.

FIG. 2 depicts an exemplary diagram of a multi-core processor in which aspects of the illustrative embodiments may be implemented. Multi-core processor 200 may be, for example, a single-chip multi-processor implementation directed toward distributed processing targeted for media-rich applications such as game consoles, desktop systems, and servers.

Multi-core processor 200 may be logically separated into the following functional components: principal processor element (PPE) 201, synergistic processor units (SPUS) 210, 211, and 212, and memory flow controllers (MFCS) 205, 206, and 207. Although synergistic processor elements (SPEs) 202, 203, and 204 and PPE 201 are shown by example, any type of processor element may be supported. Exemplary multi-core processor 200 implementation includes one PPE 201 and three SPEs 202, 203, and 204. In one embodiment, PPE 201 may be implemented as a Power PC® processor.

Multi-core processor 200 may be a system-on-a-chip such that each of the elements depicted in FIG. 2 may be provided on a single micro-processor chip. Moreover, multi-core processor 200 may be a heterogeneous processing environment in which each of SPUs 210, 211, and 212 may receive different instructions from each of the other SPUs in the system. Moreover, the instruction set for SPUs 210, 211, and 212 may be different from that of principal processor unit (PPU) 208, e.g., PPU 208 may execute Reduced Instruction Set Computer (RISC) based instructions while SPUs 210, 211, and 212 execute vectorized instructions.

Each SPE includes one SPU 210, 211, or 212 with its own local store (LS) area 213, 214, or 215 and a dedicated MFC 205, 206, or 207 that has an associated memory management unit (MMTJ) 216, 217, or 218 to hold and process memory protection and access permission information. Once again, although SPUs are shown by example, any type of processor unit may be supported. Additionally, multi-core processor 200 implements element interconnect bus (EIB) 219 and other I/O structures to facilitate on-chip and external data flow.

EIB 219 serves as the primary on-chip bus for PPE 201 and SPEs 202, 203, and 204. In addition, EIB 219 interfaces to other on-chip interface controllers that are dedicated to off-chip accesses. The on-chip interface controllers include the memory interface controller (MIC) 220, which provides two extreme data rate I/O (XIO) memory channels 221 and 222, and multi-core processor interface unit (BEI) 223, which provides two high-speed external I/O channels and the internal interrupt control for multi-core processor 200. BEI 223 is implemented as bus interface controllers (BICs, labeled BIC0 & BIC1) 224 and 225 and I/O interface controller (IOC) 226. The two high-speed external I/O channels connected to a plurality of Redwood Rambus® Asic Cell (RRAC) interfaces providing the flexible input and output (FlexIO_0 & FlexIO_1) 253 for the multi-core processor 200. These interfaces provide communications between multi-core processor 200 and a memory system. The type of interface used may differ depending on the type of memory system employed.

Each SPU 210, 211, or 212 has a corresponding LS area 213, 214, or 215 and synergistic execution units (SXU) 254, 255, or 256. Each individual SPU 210, 211, or 212 can execute instructions, including data load and store operations, only from within its associated LS area 213, 214, or 215. For this reason, MFC direct memory access (DMA) operations via SPU's 210, 211, and 212 dedicated MFCs 205, 206, and 207 perform all required data transfers to or from storage elsewhere in a system.

A program running on SPU 210, 211, or 212 only references its own LS area 213, 214, or 215 using a LS address. However, each SPU's LS area 213, 214, or 215 is also assigned a real address (RA) within the overall system's memory map. The RA is the address for which a device will respond. In the Power PC®, which is one example of a processor that can serve as a principal processor element such as PPE 201, an application refers to a memory location (or device) by an effective address (EA), which is then mapped into a virtual address (VA) for the memory location (or device) which is then mapped into the RA. The EA is the address used by an application to reference memory and/or a device. This mapping allows an operating system to allocate more memory than is physically in the system (i.e. the term virtual memory referenced by a VA). A memory map is a listing of all the devices (including memory) in the system and their corresponding RA. The memory map is a map of the real address space which identifies the RA for which a device or memory will respond.

This allows privileged software to map a LS area to the EA of a process to facilitate direct memory access transfers between the LS of one SPU and the LS area of another SPU. PPE 201 may also directly access any SPU's LS area using an EA. In the Power PC®, which is one example of a processor that can serve as a principal processor element such as PPE 201, there are three states. These states include problem, privileged, and hypervisor. Privileged software is software that is running in either the privileged or hypervisor states. These states have different access privileges. For example, privileged software may have access to the data structures register for mapping real memory into the EA of an application. Problem state is the state the processor is usually in when running an application and usually is prohibited from accessing system management resources, such as the data structures for mapping real memory.

The MFC DMA data commands include one LS address and one EA. DMA commands copy memory from one location to another. In this case, an MFC DMA command copies data between an EA and a LS address. The LS address directly addresses LS area 213, 214, or 215 of associated SPU 210, 211, or 212 corresponding to the MFC command queues. Command queues are queues of MFC commands. There is one queue to hold commands from the SPU and one queue to hold commands from the PXU or other devices. However, the EA may be arranged or mapped to access any other memory storage area in the system, including LS areas 213, 214, and 215 of the other SPEs 202, 203, and 204.

Main storage (not shown) is shared by PPU 208, PPE 201, SPEs 202, 203, and 204, and I/O devices (not shown) in a system, such as the system shown in FIG. 2. All information held in main memory is visible to all processors and devices in the system. Programs reference main memory using an EA. Since the MFC proxy command queue, control, and status facilities have RAs and the RA is mapped using an EA, it is possible for a principal processor element to initiate DMA operations, using an EA between the main storage and local storage of the associated SPEs 202, 203, and 204.

As an example, when a program running on SPU 210, 211, or 212 needs to access main memory, the SPU program generates and places a DMA command, having an appropriate EA and LS address, into its MFC 205, 206, or 207 command queue. After the command is placed into the queue by the SPU program, MFC 205, 206, or 207 executes the command and transfers the required data between the LS area and main memory. MFC 205, 206, or 207 provides a second proxy command queue for commands generated by other devices, such as PPE 201. The MFC proxy command queue is typically used to store a program in local storage prior to starting the SPU. MFC proxy commands can also be used for context store operations.

The EA address provides the MFC with an address which can be translated into a RA by the MMU. The translation process allows for virtualization of system memory and access protection of memory and devices in the real address space. Since LS areas are mapped into the real address space, the EA can also address all the SPU LS areas.

PPE 201 on multi-core processor 200 consists of 64-bit PPU 208 and multi-processor storage subsystem (PPSS) 209. PPU 208 contains processor execution unit (PXU) 229, level 1 (L1) cache 230, MMU 231 and replacement management table (RMT) 232. PPSS 209 consists of cacheable interface unit (CIU) 233, non-cacheable unit (NCU) 234, level 2 (L2) cache 228, RMT 235 and bus interface unit (BIU) 227. BIU 227 connects PPSS 209 to EIB 219.

SPU 210, 211, or 212 and MFCs 205, 206, and 207 communicate with each other through unidirectional channels that have capacity. Channels are essentially a FIFO which are accessed using an SPU instruction, such as read channel (RDCH), write channel (WRCH), and read channel count (RDCHCNT). The RDCHCNT returns the amount of information in the channel. The capacity is the depth of the FIFO. The channels transport data to and from MFCs 205, 206, and 207, SPUs 210, 211, and 212. BIUs 239, 240, and 241 connect MFCs 205, 206, and 207 to EIB 219.

MFCs 205, 206, and 207 provide two main functions for SPUs 210, 211, and 212. MFCs 205, 206, and 207 move data between SPUs 210, 211, or 212, LS area 213, 214, or 215, and main memory. Additionally, MFCs 205, 206, and 207 provide synchronization facilities between SPUs 210, 211, and 212 and other devices in the system.

MFCs 205, 206, and 207 implementation has four functional units: direct memory access controllers (DMACs) 236, 237, and 238, MMUs 216, 217, and 218, atomic units (ATOs) 242, 243, and 244, RMTs 245, 246, and 247, and BIUs 239, 240, and 241. DMACs 236, 237, and 238 maintain and process MFC command queues (MFC CMDQs) (not shown), which consist of a MFC SPU command queue (MFC SPUQ) and a MFC proxy command queue (MFC PrxyQ). The sixteen-entry, MFC SPUQ handles MFC commands received from the SPU channel interface. The eight-entry, MFC PrxyQ processes MFC commands coming from other devices, such as PPE 201 or SPEs 202, 203, and 204, through memory mapped input and output (MMIO) load and store operations. A typical direct memory access command moves data between LS area 213, 214, or 215 and the main memory. The EA parameter of the MFC DMA command is used to address the main storage, including main memory, local storage, and all devices having a RA. The local storage parameter of the MFC DMA command is used to address the associated local storage.

In a virtual mode, MMUs 216, 217, and 218 provide the address translation and memory protection facilities to handle the EA translation request from DMACs 236, 237, and 238 and send back the translated address. Each SPE's MMU maintains a segment lookaside buffer (SLB) and a translation lookaside buffer (TLB). The SLB translates an EA to a VA and the TLB translates the VA coming out of the SLB to a RA. The EA is used by an application and is usually a 32-bit or 64-bit address. Different application or multiple copies of an application may use the same EA to reference different storage locations. For example, two copies of an application each using the same EA, will need two different physical memory locations. To accomplish this, the EA is first translated into a much larger VA space which is common for all applications running under the operating system. The EA to VA translation is performed by the SLB. The VA is then translated into a RA using the TLB, which is a cache of the page table or the mapping table containing the VA to RA mappings. This table is maintained by the operating system.

ATOs 242, 243, and 244 provide the level of data caching necessary for maintaining synchronization with other processing units in the system. Atomic direct memory access commands provide the means for the synergist processor elements to perform synchronization with other units.

The main function of BIUs 239, 240, and 241 is to provide SPEs 202, 203, and 204 with an interface to the EIB. EIB 219 provides a communication path between all of the processor cores on multi-core processor 200 and the external interface controllers attached to EIB 219.

MIC 220 provides an interface between EIB 219 and one or two of XIOs 221 and 222. In one embodiment, extreme data rate (XDR™) dynamic random access memory (DRAM) is a high-speed, highly serial memory provided by Rambus®. A macro provided by Rambus® accesses the extreme data rate dynamic random access memory, referred to in this document as XIOs 221 and 222.

MIC 220 is only a slave on EIB 219. MIC 220 acknowledges commands in its configured address range(s), corresponding to the memory in the supported hubs.

BICs 224 and 225 manage data transfer on and off the chip from EIB 219 to either of two external devices. BICs 224 and 225 may exchange non-coherent traffic with an I/O device, or it can extend EIB 219 to another device, which could even be another multi-core processor. When used to extend EIB 219, the bus protocol maintains coherency between caches in the multi-core processor 200 and the caches in the attached external device, which could be another multi-core processor.

IOC 226 handles commands that originate in an I/O interface device and that are destined for the coherent EIB 219. An I/O interface device may be any device that attaches to an I/O interface such as an I/O bridge chip that attaches multiple I/O devices or another multi-core processor 200 that is accessed in a non-coherent manner. IOC 226 also intercepts accesses on EIB 219 that are destined to memory-mapped registers that reside in or behind an I/O bridge chip or non-coherent multi-core processor 200, and routes them to the proper I/O interface. IOC 226 also includes internal interrupt controller (IIC) 249 and I/O address translation unit (I/O Trans) 250.

Pervasive logic 251 is a controller that provides the clock management, test features, and power-on sequence for the multi-core processor 200. Pervasive logic may provide the thermal management system for the processor. Pervasive logic contains a connection to other devices in the system through a Joint Test Action Group (JTAG) or Serial Peripheral Interface (SPI) interface, which are commonly known in the art.

Although specific examples of how the different components may be implemented have been provided, this is not meant to limit the architecture in which the aspects of the illustrative embodiments may be used. The aspects of the illustrative embodiments may be used with any multi-core processor system.

The illustrative embodiments recognize that having a programmer manually create code for a PPE and an SPE is time consuming. These and other factors associated with entering code for a multi-processor chip, such as multi-core processor 200 in FIG. 2, makes developing code for a multi-processor system time consuming and expensive. The different embodiments provide a computer implemented method, apparatus, and computer useable program code for generating code to process data using a multi-processor system. Specifically, the illustrative embodiments are directed towards a multi-processor chip that contains a principle processor and a set of ancillary SIMD accelerators or processors. In these examples, the principle processor is a PPE and the ancillary SIMD accelerators or processors are SPEs as shown in FIG. 2. In accordance with an illustrative embodiment, a compiler performs many of the manual functions required to be performed by the user as in currently used techniques. In this illustrative embodiment, a user prepares a program or collection of source files comprising a program for execution on a multi-core processor without regard to whether execution will occur on either the PPE (principal) or SPE (ancillary) processors. A program prepared in this manner is referred to as a "single source" program.

In other words, the programmer does not have to write code specifically for the different types of processors on the multi-core processor system. A compiler receives a single source program. The compiler analyzes the source code to discover loops that can be vectorized using currently known techniques. Any such detected loops are extracted form the source program and placed in separate independent functions, a process known to one skilled in the art as "outlining". The code for these loops is referred to as vectorizable loop code.

The compiler inserts into the source code, at the location of identified vectorizable loops, a call to a runtime library function that is configured to cause the extracted components to be executed at runtime. The compiler inserts this call at the location of identified vectorizable loops. The computer compiles the extracted loops for execution using the single instruction stream multiple data stream (SIMD) instruction set of the SPEs. Then, the compiler compiles the remainder of the program, which now contains runtime calls instead of the identified vectorizable loops, for execution using the instruction set of the PPE. The compiled code for the extracted vector loops is placed in the completed program in such a way that the compiled code, mentioned above, can load the appropriate objects at runtime when required.

When compiling the extracted SIMD loops for the SPEs, the compiler generates instructions to access the vector data needed to accomplish the original program statements. These instructions include parameters to cause each of the SPEs to fetch the segment of data on which it will perform comptation. In effect, the data management code splits the vector data into chunks that are operated on separately by the available SPEs.

In addition, the SPE code incorporates the loop control of the original loop, and this code may be further optimized by the compiler. In particular, the compiler may employ optimizations intended to allow for prefetching of the vector data. Other further optimizations are also possible, such as, for example, extraction of multiple vector operations at the same time or extraction of outer loop code that may also be executed on the SPEs.

In a simple case, when the PPE's program reaches the point of executing an executable vectorized instruction sequences for a vectorizable loop, the PPE sends the vectorized instruction sequences for this loop to each of a group of available SPEs and initiates execution of the code on the SPEs. The PPE portion of the program will wait until all SPEs in a group have finished execution before continuing. Further analysis may allow for optimizations. For example, in one such optimization, multiple outlined vectorizable instruction sequences may be combined into a single executable object, and sent to the SPEs together. Another possible optimization is to analyze the data dependences between the vectorized code and the following sequential code. This information is used to guide the placement of synchronization statements. In this way, the PPE program may be allowed to proceed before all the SPEs complete the execution of their vectorized code, so long as the PPE program waits at the designated synchronization point. This is a point beyond which the PPE cannot continue execution until all the SPEs have completed their execution. Sequential code is non-SIMDized code that executes only on the PPE.

In the most general case, the compiler extracts the vectorizable code from stride-1 array accesses only. Non-stride-1 accesses are accesses to non-contiguous chunks of data. In these examples, the vectorizable code is the executable vectorizable instruction sequences. Unlike the prior art, which is constrained to SIMDize only stride-1 accesses, it is possible to use the technique in this exemplary embodiment on non-stride-1 accesses. In the case of non-stride-1 accesses, the data management code generated in the SPE code sections must be tailored to ensure this access, for example using a DMA list type of operation with a gather/scatter feature. Any potential for performance degradation using this approach may be mitigated by the use of known tiling optimizations. Tiling is a known technique for structuring data accesses to ensure locality of data reference. This technique involves breaking the iteration space into tiles of two or more dimensions and rewriting the loop control and array subscripts to access the data in successive tiles, thus ensuring successive array accesses are to physically contiguous memory.

Vectorization of non-stide-1 accesses results in more complex code as the data has to be manipulated into the vector/SIMD registers for computations, and returned to the correct memory location on completion of the computation. In the approach described in these embodiments, the data has to be transferred from system memory to the accelerator local memory, and the data transfer commands, such as a DMA list command with a scatter/gather feature, may ensure that each SPE receives the data in such a way that it can operate on the data elements contiguously.

Figure 3:
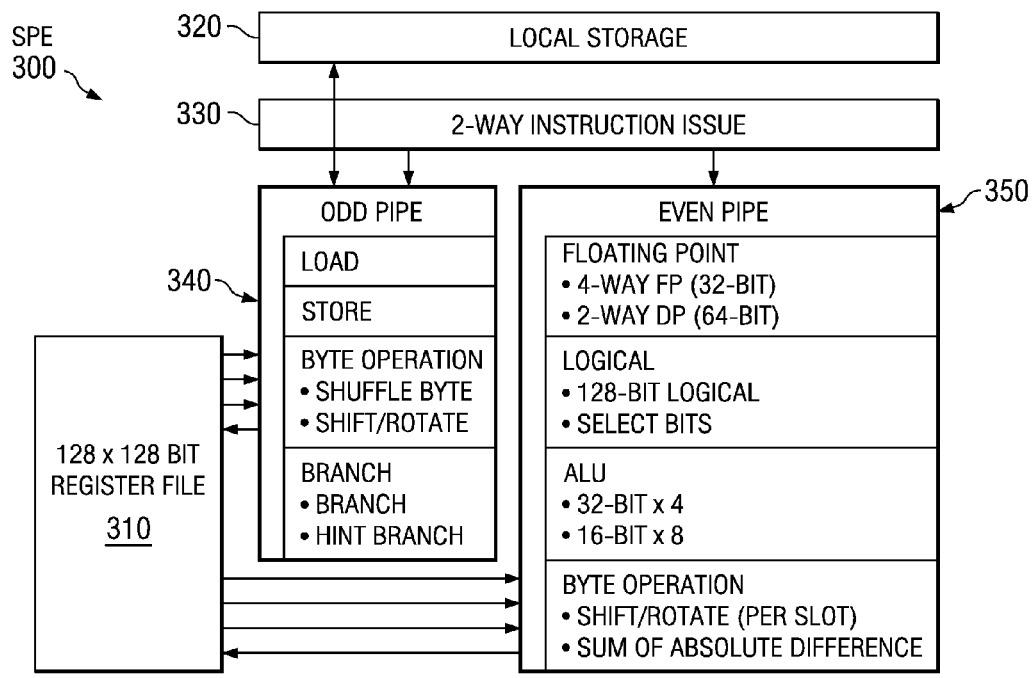
FIG. 3 is a block diagram illustrating an example of instruction processing in a synergistic processor element in accordance with an illustrative embodiment.

FIG. 3 is a block diagram illustrating an example of instruction processing in a synergistic processor element in accordance with an illustrative embodiment. SPE 300 stores instructions to be executed in local storage 320. Two-way instruction issue 330 issues instructions to odd pipe 340 and even pipe 350. A pipe in a processor is a set of stages used to process an instruction. Each stage in a pipe may perform a different function. For example, a pipe may have a fetch, decode, execute, and write stages.

In these examples, odd pipe 340 performs load operations, store operations, byte operations, and branch operations on data from register file 310. As shown in the example of FIG. 3, register file 310 includes 128 registers that are 128 bits in length. Byte operations include shuffle byte operations and shift/rotate byte operations. Branch operations include an operation to take a branch and a hint branch operation.

Even pipe 350 performs floating point operations, logical operations, arithmetic logic unit (ALU) operations, and byte operations on data from register file 310 in the depicted examples. In the depicted example, floating point operations include four-way floating point (four 32-bit operations on a 128-bit register) and two-way double precision (DP) floating point (two 64-bit operations on a 128-bit register). Logical operations include 128-bit logical operations and select bits operations. ALU operations include 32-bit operations on four data portions of a 128-bit register and 16-bit operations on eight data portions of a 128-bit register. Byte operations for even pipe 350 include shift/rotate operations and sum of absolute difference operations.

As seen above, floating point operations and ALU operations, for example, may perform operations on portions of a register rather than the entire 128-bit register. Performing an operation on multiple sets of data within a register is referred to as "vectorization". Vectorization is typically used to perform operations on two or more sets of data at the same time. SPE 300 loads registers in register file 310 with data and the mathematical operation is performed on all data in a register, or even a set of registers in parallel.

When processing array data in loops, it may be possible to vectorize the computations. All of the bits of the storage location legitimately receive new values from the register when the data is stored back to memory.

Figure 4:
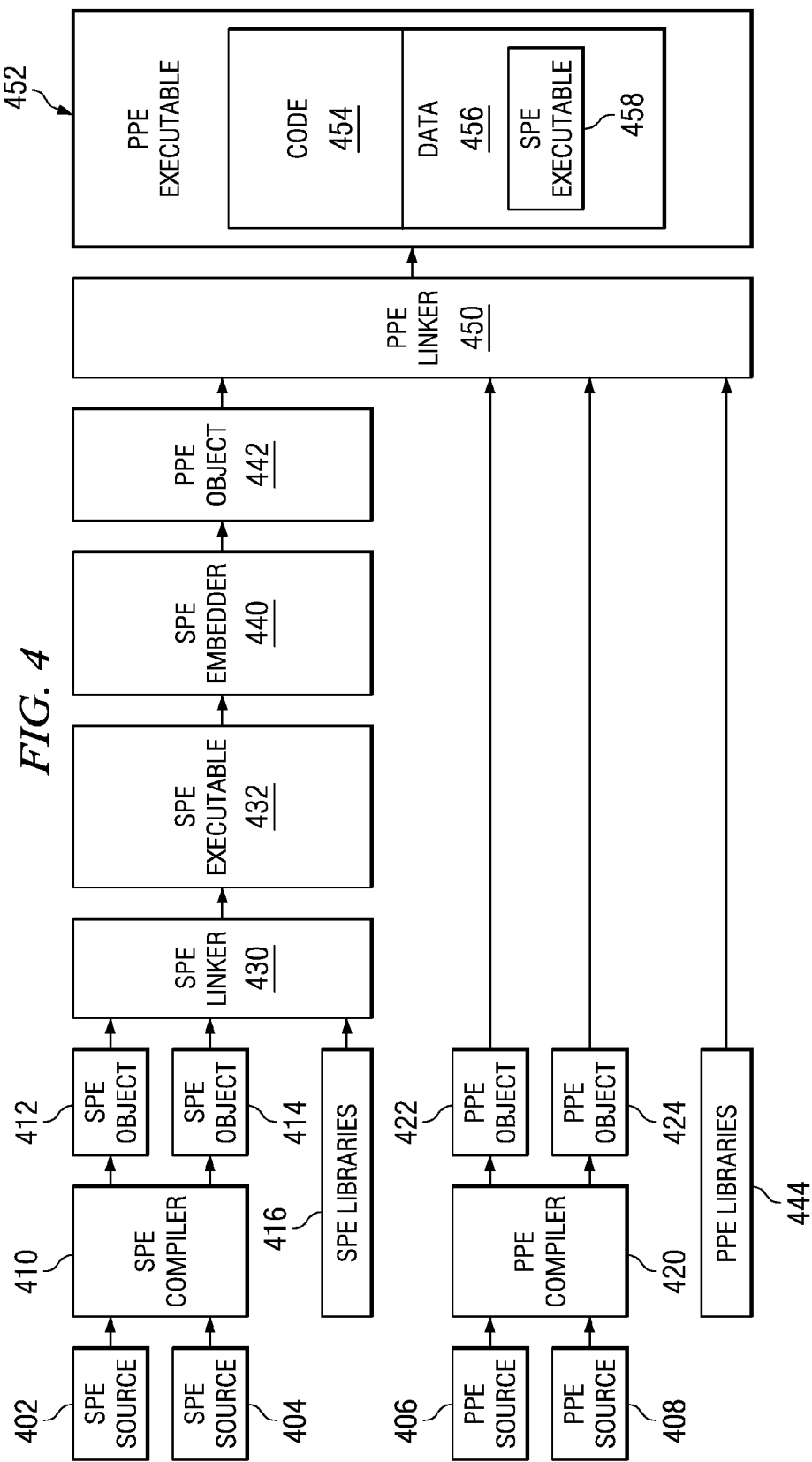
FIG. 4 illustrates a configuration for compiling and binding a program for a processor in accordance with an illustrative embodiment.

FIG. 4 illustrates a configuration for compiling and binding a program for a multi-core processor such as multi-core processor 200 in FIG. 2 in accordance with an illustrative embodiment. A multi-core processor application developer partitions the program into PPE and SPE parts. The developer writes the SPE source code 402, 404 to use SPE intrinsics. The developer codes the PPE source code 406 and 408 including the necessary commands to load and execute the SPE functions at the appropriate points.

A user sends SPE source code 402 and 404 to SPE compiler 410. In turn, SPE compiler 410 generates SPE objects 412 and 414. SPE linker 430 links SPE objects 412 and 414 together with SPE libraries 416 to form SPE executable 432. SPE embedder 440 converts SPE executable 432 into a form that may be embedded into data 456 of PPE executable 458. SPE embedder 440 generates PPE object 442.

In this example, a user sends PPE source 406 and 408 to PPE compiler 420, which generates PPE objects 422 and 424. PPE linker 450 links PPE objects 422, 424, and 442 together with PPE libraries 444 to create PPE executable 452. This executable includes PPE code 454 and data 456. SPE executable 458 is located within data 456.

Figure 5:
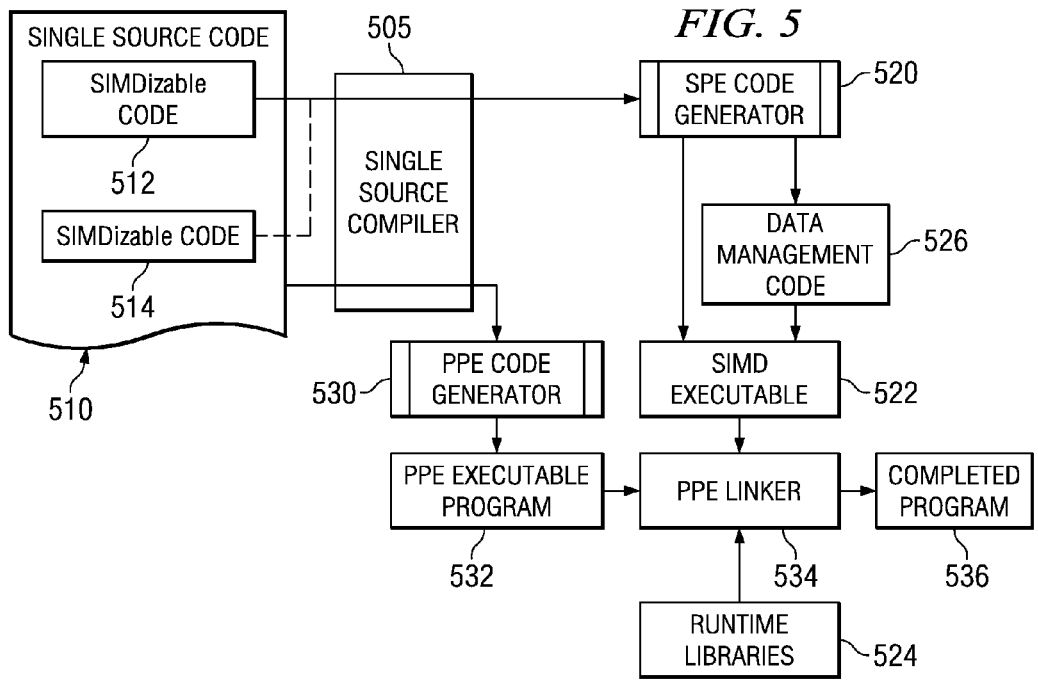
FIG. 5 is a block diagram illustrating a compiler configuration for employing multiple autonomous SIMD accelerators to perform computation in parallel on long vectors in accordance with an illustrative embodiment.

FIG. 5 is a block diagram illustrating a compiler configuration for employing multiple autonomous SIMD accelerators to process long vectors in accordance with an illustrative embodiment. Although the examples above are directed towards accelerators in the form of SPEs, the different embodiments may be applied to any type of accelerator. An accelerator is an application specific processor, for example, one which is architected to execute a particular type of code very efficiently. For example, SPE SIMD units are designed to efficiently execute media workloads.

The single source compiler 505 receives single source code 510. Single source code 510 may be received in response to user input designating single source code 510 for compiling by user. The compiler analyzes single source code 510 to identify SIMDizable code 512 and 514. The compiler 505 extracts and outlines the SIMDizable code 512 and 514 from single source code 510. SPE code generator 520 then compiles SIMDizable code 512 and 514 to form SIMD executable 522 using the single instruction stream multiple data stream (SIMD) instruction set of the SPEs.

The single source compiler 505 additionally replaces the identified and outlined vector loops from single source code 510 with calls to runtime library routines which will cause the extracted components to be executed at runtime. In these examples, single source complier 505 finds the identified and outlying vector loops from the source code. This process is also referred to as identifying SIMD parallelism. PPE code generator 530 compiles the remainder of single source code 510 for execution using the instruction set of the PPE to form PPE executable program 532. The compiled code for the extracted vector loops is placed into the completed program 536 by the PPE linker 534, in such a way that runtime libraries 524 are used to load the appropriate SPE executables and data at runtime when required. In these illustrative embodiments, PPE executable 452 in FIG. 4 and completed program 536 may be the same programs. These programs are arrived at by different methods and execute in a different way. Runtime libraries 524 are collections of helper functions that may be invoked by compiler generated code during execution of a program.

When compiling the extracted vector loops for the SPEs, SPE code generator 520 generates data management code 526 to transfer the array data needed to accomplish the original program statements. Data management code 526 must be parameterized so that each of the SPEs may fetch the data intended for it, in effect splitting the vector data into chunks that are operated on separately by the available SPEs.

Figure 6:
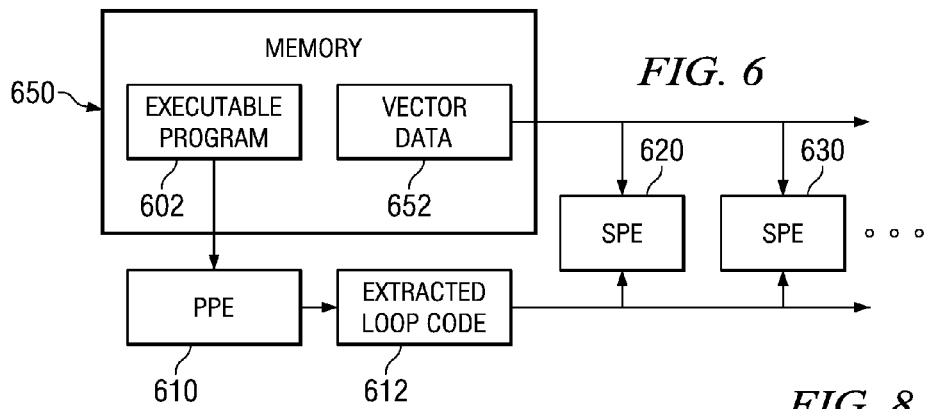
FIG. 6 is a block diagram illustrating operation of a single source program compiled to employ multiple autonomous SIMD accelerators to perform computation in parallel on long vectors in accordance with an illustrative embodiment.

FIG. 6 is a block diagram illustrating operation of a single source program compiled to employ multiple autonomous SIMD accelerators to operate on long vectors in accordance with an illustrative embodiment. Memory 650 contains executable program 602. PPE executable 452 in FIG. 4 is an example of executable program 602 and vector data 652. Vector data 652 is the data that executable program 602 operates on at execution time. This data is applied by the user but transferred to the SPEs by the data management code. At runtime, instructions from executable program 602 execute on the PPE 610.

When executable program 602 reaches the runtime library call which replaced the extracted vector loop, PPE 610 invokes this runtime library function to send the extracted loop code 612 for the extracted vector loop to each of a group of available SPEs, such as SPEs 620 and 630 in the depicted example. PPE then initiates execution of extracted loop code 612 by SPEs 620 and 630. In the illustrative examples, extracted loop code 612 includes data management code. This data management code may contain direct memory access (DMA) instructions such as DMA-read or DMA-write to get and put data from the main system memory 605 into the local memories of the SPEs 620 and 630. When extracted loop code 612 executes on SPEs 620 and 630, the data management code accesses vector data 652 from memory 650. The portion of program 602 executing on PPE 610 waits until SPEs 620 and 630 have finished execution before continuing execution.

Figure 7:
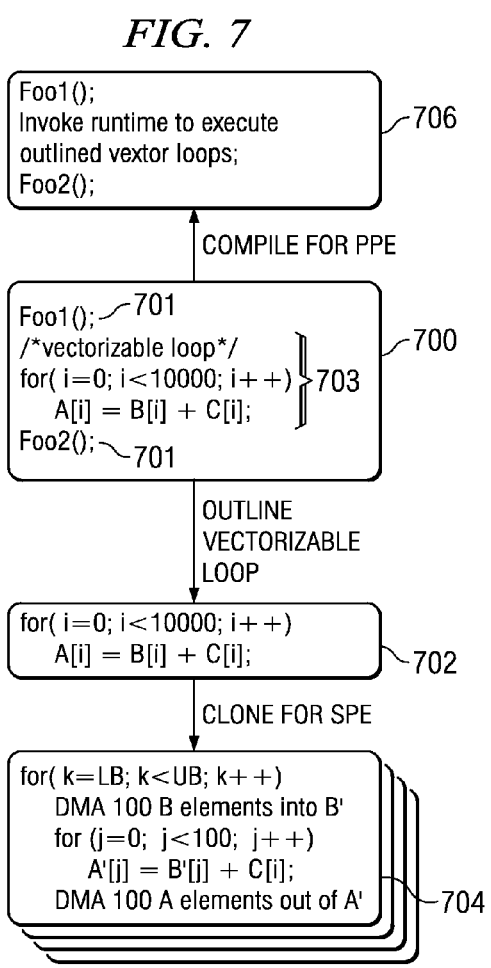
FIG. 7 illustrates an example of single source code compiled for a primary processor and ancillary SIMD accelerators in accordance with an illustrative embodiment.

FIG. 7 is a block diagram illustrating an example of single source compiler, compiling a single source program for a primary processor and ancillary SIMD accelerators in accordance with an illustrative embodiment. In this example, block 700 contains the single source code. Code 701 represents source code which will be compiled to execute on the PPE, and 703 represents source code which the compiler will determine should be executed in vector mode on the ancillary SIMD accelerators. The single source compiler depicted in FIG. 7 identifies and outlines vectorizable loop 702. In this illustrative example, the compiler partitions the vectorizable loop 702 into chunks of 100 elements, by parameterizing the outlined function with the starting and ending array elements that this code will operate on, and clones the loop for a plurality of SPEs as shown in block 704. As shown in block 704 in this example, each SPE receives a different upper and lower bound for execution. The compiler then compiles the remainder of the single source for the PPE and inserts calls to runtime library code to initiate execution of the extracted outlined vector loops as shown in block 706. Runtime library code is a collection of executable software functions in the machine language of a target computer.

Figure 8:
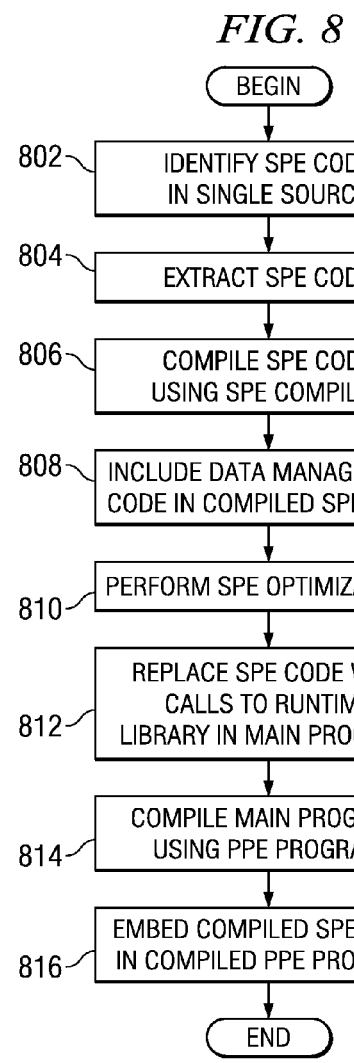
FIG. 8 is a flowchart illustrating a process in a compiler to employ multiple autonomous SIMD accelerators to perform computation in parallel on long vectors in accordance with an illustrative embodiment.

FIG. 8 is a flowchart illustrating a process in a compiler to employ multiple autonomous synergistic processors to execute long vectors in accordance with an illustrative embodiment. It will be understood that each step of the flowchart illustrations, and combinations of steps in the flowchart illustrations, can be implemented by computer program instructions. These computer program instructions may be provided to a processor or other programmable data processing apparatus to produce a machine, such that the instructions that execute on the processor or other programmable data processing apparatus create means for implementing the functions specified in the flowchart.

These computer program instructions may also be stored in a computer-readable memory, transmission medium, or storage medium that can direct a processor or other programmable data processing apparatus to function in a particular manner, such that the instructions stored in the computer-readable memory, transmission medium, or storage medium produce an article of manufacture including instruction means which implement the functions specified in the flowchart step or steps.

Accordingly, steps of the flowchart illustrations support combinations of means for performing the specified functions, combinations of steps for performing the specified functions and computer usable program code for performing the specified functions. It will also be understood that each step of the flowchart illustrations, and combinations of steps in the flowchart illustrations, can be implemented by special purpose hardware-based computer systems which perform the specified functions or steps, or by combinations of special purpose hardware and computer instructions. More particularly, the steps of the flowchart illustration may be implemented by the compiler configuration illustrated in FIG. 5, for example.

With particular reference to FIG. 8, a flowchart illustrating a process in a compiler to employ multiple autonomous SIMD accelerators to perform computation in parallel on long vectors in accordance with an illustrative embodiment. The process begins with the compiler identifying vectorizable SPE code from a single source program (step 802). The compiler extracts the vectorizable SPE code (step 804) and compiles that SPE code using an auto-SIMDizable SPE compiler (step 806).

The compiler inserts the necessary data management code in the compiled SPE code (step 808) and performs SPE optimizations (step 810). For example, the compiler may employ optimizations intended to allow for prefetching of the vector data for an SPE. Further optimizations are also possible, such as extraction of multiple vector operations at the same time or extraction of outer loop code that may also be executed on the SPEs. Outer loop code is a loop in which the vector loop is contained.

Then, the compiler replaces the SPE code with calls to runtime libraries in the main program (step 812). The compiler then compiles the main program using a PPE compiler (step 814) and places the compiled SPE object in the compiled PPE executable program (step 816). Thereafter, the process ends.

Figure 9:
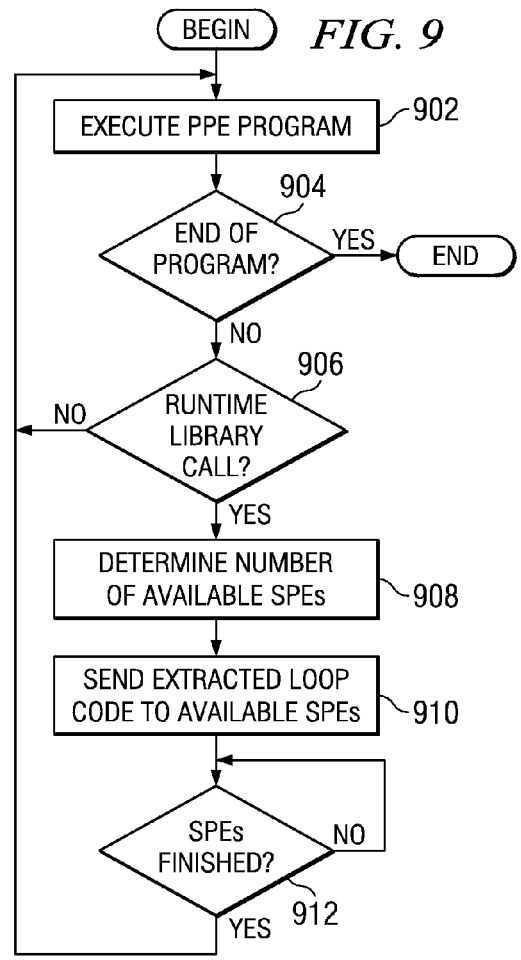
FIG. 9 is a flowchart illustrating operation of a single source program compiled to employ multiple autonomous synergistic processors to execute long vectors in accordance with an illustrative embodiment.

FIG. 9 is a flowchart illustrating operation of a single source program compiled to employ multiple autonomous synergistic processors to execute long vectors in accordance with an illustrative embodiment. The process begins with the PPE executing the PPE program (step 902). The PPE determines whether the end of the program is reached (step 904). If the end of the program is reached, the process ends.

If the end of the program is not reached in step 904, the PPE determines whether runtime library calls are encountered in the program (step 906). If a runtime library call is not encountered, the process returns to step 902 to execute the PPE program. If a runtime library call is encountered in step 906, the PPE determines the number of available SPEs (step 908). The PPE may make this determination, for example, by using operating system calls.

Next, the PPE sends the extracted loop code to the available SPEs (step 910). In these illustrative examples, the extracted loop code may be parameterized such that each of the SPEs may fetch the data intended for it based on the number of available SPEs. In these examples, the vector data, such as upper and lower bounds for array processing, are also provided to the SPEs.

Thereafter, the PPE awaits a signal from each of the executing SPEs to determine whether all of the SPEs have finished execution (step 912). If the SPEs have not finished execution, the process returns to step 912 and this step repeats. In this manner, the PPE waits until all of the SPEs have finished execution. If the SPEs have finished execution in step 912, the process returns to step 902 to execute the PPE program. In an alternative embodiment, the PPE program may be allowed to continue executing sequential code until synchronization is required.

Thus, the exemplary embodiments solve the deficiencies of the prior art by providing a mechanism in a compiler for employing multiple autonomous synergistic processors to operate on, or process long vectors of data. A developer may provide a single source program. The compiler extracts vectorizable code from the single source program and compiles the vectorizable code for the ancillary processors. The compiler also generates data management code for the extracted code and replaces the extracted code with runtime library calls in the main program. Using the compiler of the exemplary embodiment, a developer need only write a single source program, rather than writing a main program to execute on the principal processor and separate loop code to execute on the ancillary processors.

The exemplary embodiments can take the form of an entirely hardware embodiment, an entirely software embodiment or an embodiment containing both hardware and software elements. The exemplary embodiments may be implemented in software, which includes but is not limited to firmware, resident software, microcode, etc.

Furthermore, the exemplary embodiments can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the exemplary embodiments has been presented for purposes of illustration and description, and is not intended to be exhaustive or limited to the invention in the form disclosed. Many modifications and variations will be apparent to those of ordinary skill in the art. The embodiments were chosen and described in order to best explain the principles of the invention, the practical application, and to enable others of ordinary skill in the art to understand the invention for various embodiments with various modifications as are suited to the particular use contemplated.

What is claimed is:

1. A computer implemented method for a compiler to compile a single source program to employ multiple ancillary SIMD accelerators, the computer implemented method comprising:
   receiving, by the compiler, the single source program;
   identifying vectorizable loop code in the single source program;
   extracting the vectorizable loop code from the single source program to form extracted vectorizable loop code;
   compiling the extracted vectorizable loop code using an SIMD instruction set to form executable vectorized instruction sequences to be executed by the multiple ancillary SIMD accelerators;

replacing the extracted vectorizable loop code in the single source program with calls to runtime library code to form a main program, wherein the runtime library code is configured to cause the executable vectorized instruction sequences to be executed at runtime, and wherein the runtime library code is inserted at a location that included the extracted vectorizable loop;

compiling the main program for a principal processor using an instruction set of a processor using an instruction set of a processor that executes code sequentially to form an executable main program that includes only sequential code that is to be executed by the processor, wherein the executable main program controls operation of the executable vectorized instruction sequences on the multiple ancillary SIMD accelerators;

inserting data management code in the executable vectorized instruction sequences, wherein the data management code accesses vector data for a given one of the multiple ancillary SIMD accelerators; the data management code is configured to allow each one of the multiple ancillary SIMD accelerators to perform computation on vector data with non-stride-1 array accesses; and forming a completed program by placing the executable vectorized instruction sequences into the executable main program.

2. The computer implemented method of claim 1, wherein the data management code comprises direct memory access operations.

3. The computer implemented method of claim 1,
wherein the runtime library code is configured to cause the executable vectorized instruction sequences to be executed at runtime on the multiple ancillary SIMD accelerators.

4. The computer implemented method of claim 1, wherein the completed program can continue to execute sequential code until encountering a synchronization point while waiting for the multiple ancillary SIMD accelerators to complete execution of SIMD executable code.

5. An apparatus comprising:
multiple ancillary SIMD accelerators;
a single source compiler, wherein the compiler: identifies vectorizable loop code in a single source program, extracts the vectorizable loop code from the single source program to form extracted vectorizable loop code, and replaces the extracted vectorizable loop code in the single source program with calls to runtime library code to form a main program, wherein the runtime library code is configured to cause the executable vectorized instruction sequences to be executed at runtime, and wherein the runtime library code is inserted at a location that included the extracted vectorizable loop;
an ancillary SIMD accelerator code generator configured to compile the extracted vectorizable loop code using an SIMD instruction set to generate executable vectorized instruction sequences to be executed by the multiple ancillary SIMD accelerators;
a principal processor code generator configured to compile the main program for a principal processor using an instruction set of a processor that executes code sequentially to form an executable main program that includes only sequential code to be executed by the processor, wherein the executable main program controls operation of the executable vectorized instruction sequences on the multiple ancillary SIMD accelerators;
wherein the ancillary SIMD accelerator code generator inserts data management code in the executable vectorized instruction sequences, the data management code is configured to allow each one of the multiple ancillary SIMD accelerators to perform computation on vector data with non-stride-1 array accesses; and wherein a completed program is formed by placing the executable vectorized instruction sequences into the executable main program.

6. The apparatus of claim 5, wherein the data management code effects the transfer to and from system memory of the vector data for a given one of the multiple ancillary SIMD accelerators.

7. The apparatus of claim 5, wherein the runtime library code is configured to cause the executable vectorized instruction sequences to be executed at runtime.

8. A computer program product comprising:
a computer storage medium storing computer usable program code for a compiler to compile a single source program to employ multiple ancillary SIMD accelerators, the computer program product comprising:
computer usable program code configured to receive the single source program;
computer usable program code configured to identify vectorizable loop code in the single source program;
computer usable program code configured to extract the vectorizable loop code from the single source program;
computer usable program code configured to compile the extracted vectorizable loop code using an SIMD instruction set to form executable vectorized instruction sequences to be executed by the multiple ancillary SIMD accelerators;
computer usable program code configured to replace the extracted vectorizable loop code in the single source program with calls to runtime library code to form a main program, wherein the runtime library code is configured to cause the executable vectorized instruction sequences to be executed at runtime, and wherein the runtime library code is inserted at a location that included the extracted vectorizable loop;
computer usable program code configured to compile the main program for a principal processor using an instruction set of a processor that executes code sequentially to form an executable main program that includes only sequential code to be executed by the processor, wherein the executable main program controls operation of the executable vectorized instruction sequences on the multiple ancillary SIMD accelerators;
computer usable program code configured to insert data access code in the executable vectorized instruction sequences, the data access code accesses vector data for a given one of the multiple ancillary SIMD accelerators; wherein the data access code is configured to allow each one of the multiple ancillary SIMD accelerators to perform computation on vector data with non-stride-1 array accesses; and
computer usable program code configured to form a completed program by placing the executable vectorized instruction sequences into the executable main program.

9. The computer program product of claim 8, further comprising:
computer usable program code configured to replace the extracted vectorizable loop code in the single source program with calls to runtime library code, wherein the second portion includes the calls, wherein the runtime library code is configured to cause the executable vectorized instruction sequences to be executed at runtime.

* * * * *